(12) United States Patent
Hellbusch (10) Patent No.: US 9,769,981 B1
(45) Date of Patent: Sep. 26, 2017

(54) ANHYDROUS AMMONIA TANK TRAILER

(71) Applicant: James A. Hellbusch, Columbus, NE (US)

(72) Inventor: James A. Hellbusch, Columbus, NE (US)

( * ) Notice: Subject to any disclaimer, the term of this patent is extended or adjusted under 35 U.S.C. 154(b) by 0 days.

(21) Appl. No.: 14/921,121

(22) Filed: Oct. 23, 2015

(51) Int. Cl.
*B60P 3/22* (2006.01)
*A01C 23/00* (2006.01)

(52) U.S. Cl.
CPC ........... *A01C 23/008* (2013.01); *B60P 3/221* (2013.01)

(58) Field of Classification Search
CPC .......... A01C 23/008; B60P 3/221; B60P 3/22; B60P 3/2205; B60P 3/2215
USPC ........................................................ 280/839
See application file for complete search history.

(56) References Cited

U.S. PATENT DOCUMENTS

| | | | | |
|---|---|---|---|---|
| 2,074,523 A * | 3/1937 | Thwaits | ............... | B60P 3/22 220/DIG. 24 |
| 2,563,372 A * | 8/1951 | Risse | ............... | B60B 35/1018 280/43 |
| 2,603,497 A * | 7/1952 | Switzer | ............... | B60P 3/2205 105/362 |
| 2,606,673 A * | 8/1952 | Young | ............... | B60P 3/22 414/350 |
| 2,772,010 A * | 11/1956 | Buehring | ............... | B60P 1/5442 254/386 |
| 3,295,482 A * | 1/1967 | Dountas | ............... | A01C 23/008 111/120 |
| 3,578,348 A * | 5/1971 | Reinke | ............... | A01C 23/008 111/925 |
| 3,604,719 A * | 9/1971 | Kerr | ............... | B60P 3/2215 220/562 |
| 3,650,501 A * | 3/1972 | Streb | ............... | B65D 90/12 220/1.5 |
| 3,698,730 A * | 10/1972 | Hansen | ............... | B60P 3/2215 280/411.1 |
| 3,860,252 A * | 1/1975 | Martens | ............... | B62D 63/08 280/2 |
| 4,114,917 A * | 9/1978 | Jones | ............... | B62D 13/02 280/124.114 |
| 4,232,879 A * | 11/1980 | Boxrud | ............... | B60P 3/1091 280/414.1 |
| 5,186,324 A * | 2/1993 | Brandon, Jr. | ............... | B60P 1/162 137/592 |
| 5,779,255 A * | 7/1998 | Garcia, Jr. | ............... | B66F 3/02 280/404 |
| 8,820,427 B2 * | 9/2014 | Blunier | ............... | A01C 23/008 172/133 |
| 9,003,984 B2 * | 4/2015 | Blunier | ............... | A01B 59/048 111/118 |

* cited by examiner

*Primary Examiner* — Kevin Hurley
*Assistant Examiner* — Michael R Stabley
(74) *Attorney, Agent, or Firm* — Dennis L. Thomte; Thomte Patent Law Office LLC (57) ABSTRACT

An anhydrous ammonia trailer including first and second longitudinally extending frame members having first and second cross-members selectively removably secured to the frame member with the cross-members being longitudinally adjustably secured to the frame member. The cross-members enable the trailer to have first and second ammonia tanks mounted on the trailer. The trailer also enables a single ammonia tank to be supported on the adjustable cross-members.

6 Claims, 11 Drawing Sheets

ANHYDROUS AMMONIA TANK TRAILER

BACKGROUND OF THE INVENTION

Field of the Invention

This invention relates to an anhydrous ammonia tank trailer or wagon and more particularly to an anhydrous ammonia tank trailer wherein the anhydrous ammonia tank or tanks thereon are mounted on adjustable cross-members which extend between the longitudinally extending frame members of the trailer.

Description of the Related Art

Anhydrous ammonia has been extensively used as a fertilizer agent for many years. The anhydrous ammonia is usually applied to the soil by an applicator which includes a plurality of injection knives which are mounted on a tool bar or the like with the applicator being pulled through a field by a tractor. Each knife makes a small furrow in the soil. Each of the knives are fluidly connected to a source of anhydrous ammonia so that a stream of anhydrous ammonia is injected into the furrow which is then closed to maintain the anhydrous ammonia in the soil. Usually, the source of anhydrous ammonia is an anhydrous ammonia tank trailer or wagon which is pulled behind the applicator.

The prior art anhydrous ammonia tank trailers or wagons are usually designed to have one or more anhydrous ammonia tanks secured to the trailer frame in a pre-designated position. In those prior art trailers or wagons, the trailers or wagons cannot be adjusted to accommodate various sizes of tanks in different positions on the trailer. In other words, the prior art trailers or wagons will only accommodate certain sizes of tanks in a certain position.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An anhydrous ammonia trailer or wagon is disclosed which includes an elongated and generally horizontally disposed first frame member having a forward end and a rearward end. The trailer also includes an elongated and generally horizontally disposed second frame member having a forward end and a rearward end. The first and second frame members are spaced from one another. A horizontally disposed beam, having first and second ends, has its first end secured to the forward end of the first frame member and has its second end secured to the forward end of the second frame member. A pivotal wheel assembly is operatively secured to the beam so as to be positioned forwardly of the beam. A hitch tongue is secured to the pivotal wheel assembly and extends forwardly therefrom for connection to a prime mover such as an ammonia applicator, truck, tractor, etc.

The trailer also includes an elongated and horizontally disposed third frame member having first and second ends with the first end of the third frame member being secured to the rearward end of the first frame member. The second end of the third frame member is secured to the rearward end of the second frame member. A first wheel is operatively secured to the first end of the third frame member and a second wheel is operatively secured to the second end of the third frame member.

The trailer also includes an elongated and horizontally disposed first cross-member having first and second ends. The first cross-member is selectively removably secured to the first and second frame members so as to extend therebetween rearwardly of the forward ends of the first and second frame members. The first cross-member is also selectively longitudinally adjustably secured to the first and second frame members.

An elongated and horizontally disposed second cross-member, having first and second ends, is selectively removably secured to the first and second frame members so as to extend therebetween forwardly of the rearward ends of the first and second frame members. The second cross-member is also selectively longitudinally adjustably secured to the first and second frame members. The first and second cross-members are configured to have a first anhydrous ammonia tank mounted on the first ends thereof. The first and second cross-members are also configured to have a second anhydrous ammonia tank mounted on the second ends thereof so that the first and second anhydrous ammonia tanks are mounted on the trailer in a side-by-side manner.

In a second embodiment of the invention, a second set of selectively removable cross-members are utilized with the cross-members being configured to support a single anhydrous ammonia tank thereon. The second set of cross-members are longitudinally adjustably secured to the first and second frame members. The second set of cross-members are also selectively removably secured to the first and second frame members.

It is a principal object of the invention to provide an improved anhydrous ammonia tank trailer or wagon.

A further object of the invention is to provide an anhydrous ammonia tank trailer or wagon which enables the anhydrous ammonia tanks thereon to be adjustably positioned with respect to the longitudinally extending frame members of the trailer or wagon.

A further object of the invention is to provide cross-members for an anhydrous ammonia tank trailer wherein the cross-members are selectively removably secured to the frame members of the trailer or wagon.

A further object of the invention is to provide an anhydrous ammonia tank trailer or wagon wherein a pair of ammonia tanks are secured to the frame members of the trailer by cross-members which are longitudinally adjustably secured to the frame members of the trailer or wagon and wherein tanks of different sizes may be secured to the cross-members.

A further object of the invention is to provide an improved anhydrous ammonia tank trailer or wagon which may be secured to a fertilizer applicator and wherein the trailer may also be used to transport anhydrous ammonia from one location to another.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The ammonia trailer or wagon (hereinafter "trailer") of this invention is designated by the reference numeral 10. For purposes of description, trailer 10 will be described as having a forward end 12, a rearward end 14, a first side 16 and a second side 18. Trailer 10 includes an elongated and horizontally disposed first frame member 20 having a forward end 22 and a rearward end 24. Trailer 10 also includes an elongated and horizontally disposed second frame member 26 having a forward end 28 and a rearward end 30. The numeral 32 refers to an elongated and horizontally disposed third frame member or axle having wheels 34 and 36 operatively rotatably mounted on the ends thereof. Frame member or axle 32 is secured to the rearward ends 24 and 30 of frame members 20 and 26 respectively.

Trailer 10 also includes an elongated and horizontally disposed beam or frame member 38 which is secured to the forward ends 22 and 28 of frame members 20 and 26 respectively so as to extend therebetween. A pivotal wheel assembly 40 of conventional design is secured to beam 36 and is positioned forwardly of beam 38. A tongue hitch 42 extends forwardly from wheel assembly 40 for connection to a prime mover such as a truck, tractor, applicator device, etc.

Figure 1:
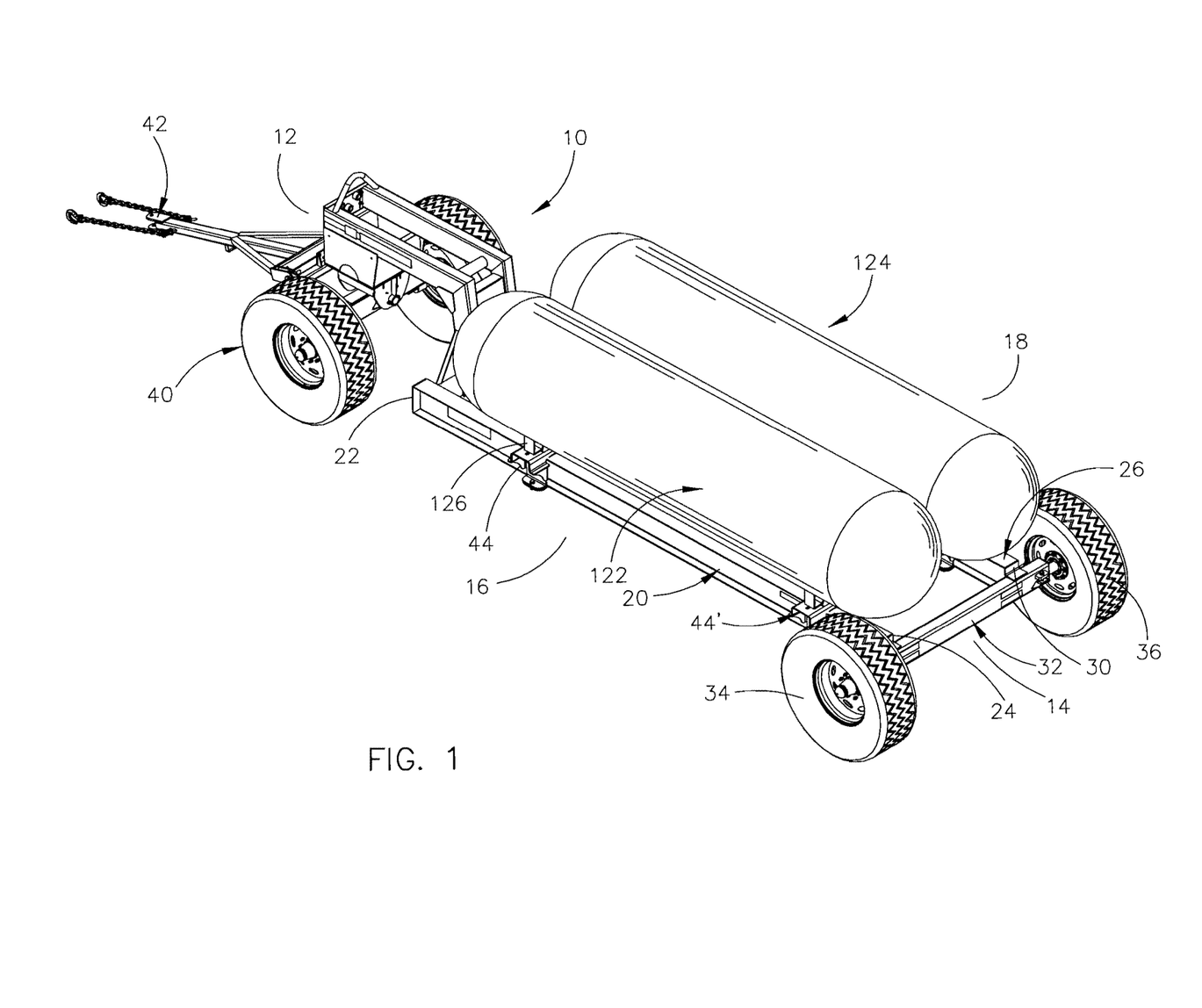
FIG. 1 is a perspective view of the anhydrous ammonia trailer of this invention.
Figure 2:
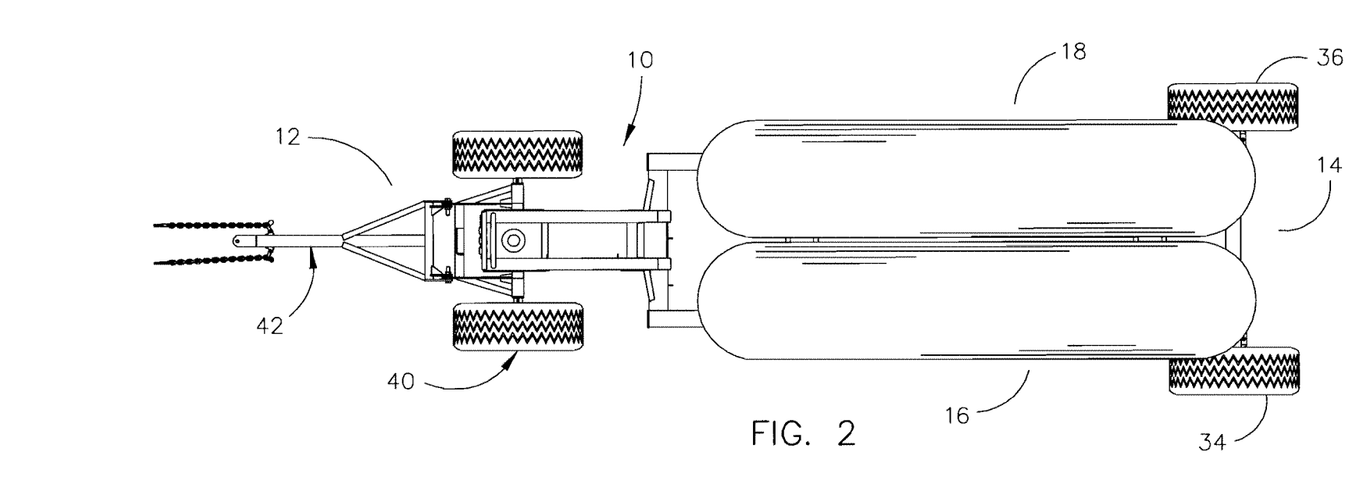
FIG. 2 is a top view of the anhydrous ammonia trailer of this invention.
Figure 3:
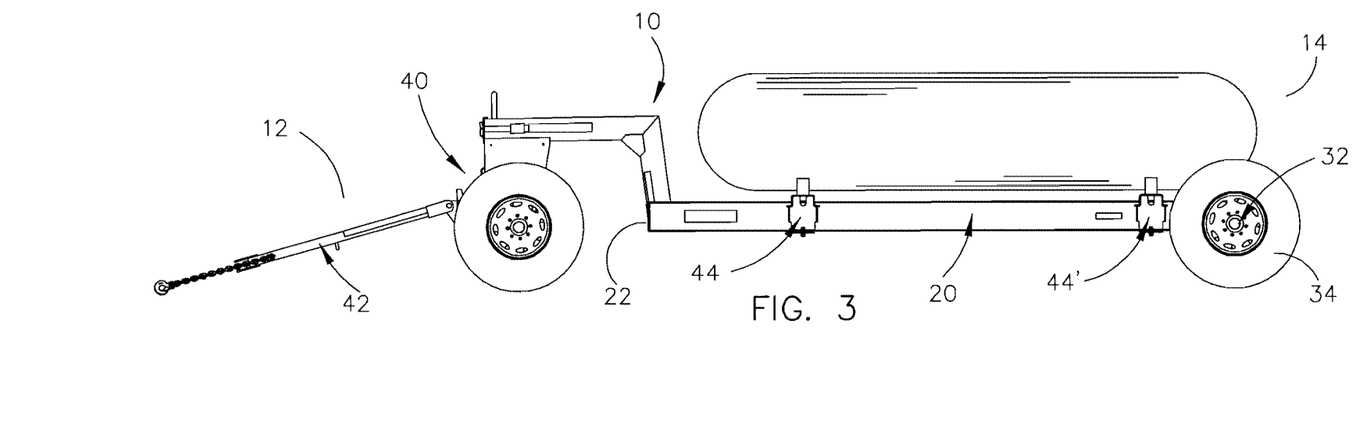
FIG. 3 is a side view of the anhydrous ammonia trailer of this invention.
Figure 4:
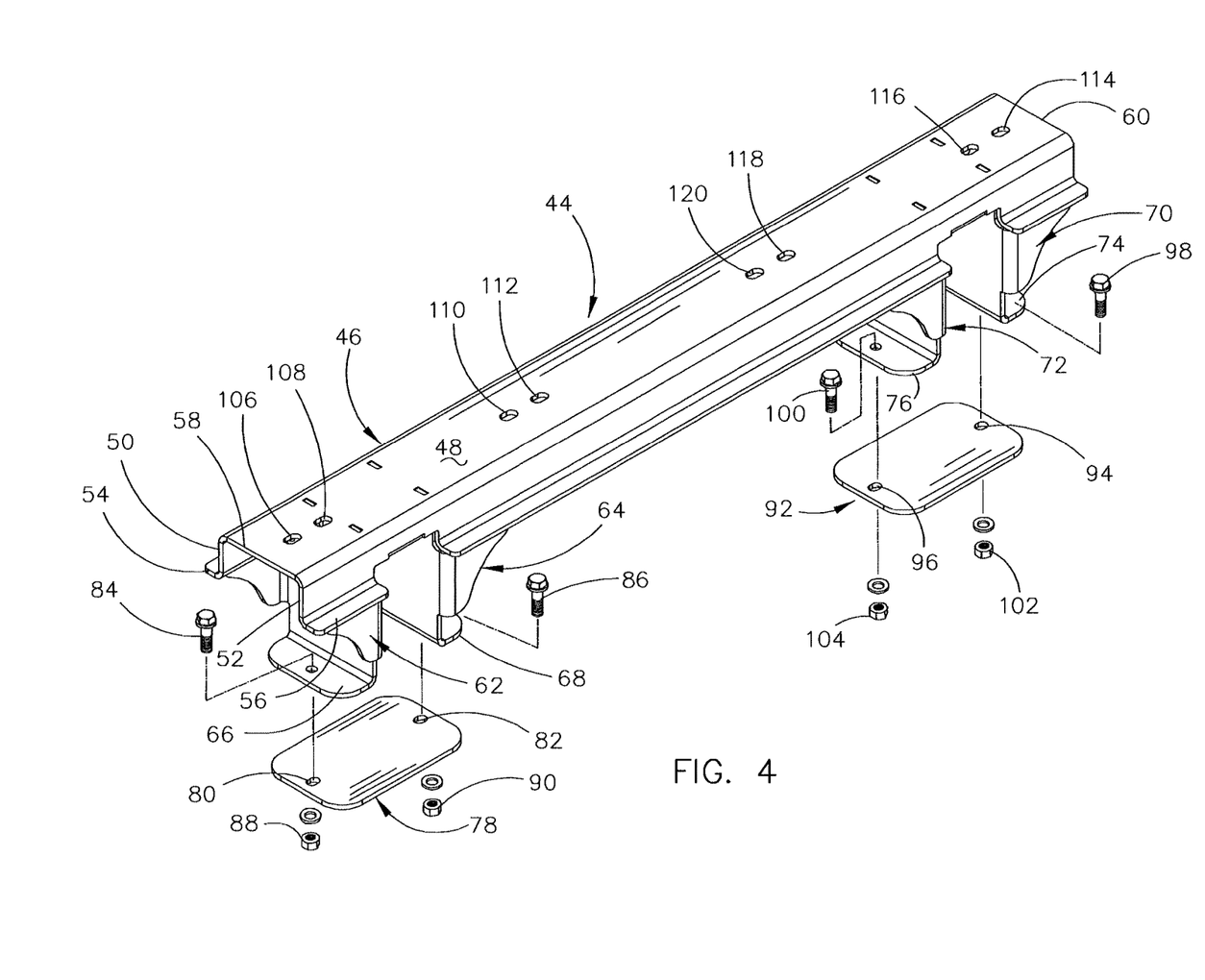
FIG. 4 is a perspective view of one of the adjustable cross-members of the anhydrous ammonia trailer of this invention.
Figures 5, 6, 7:
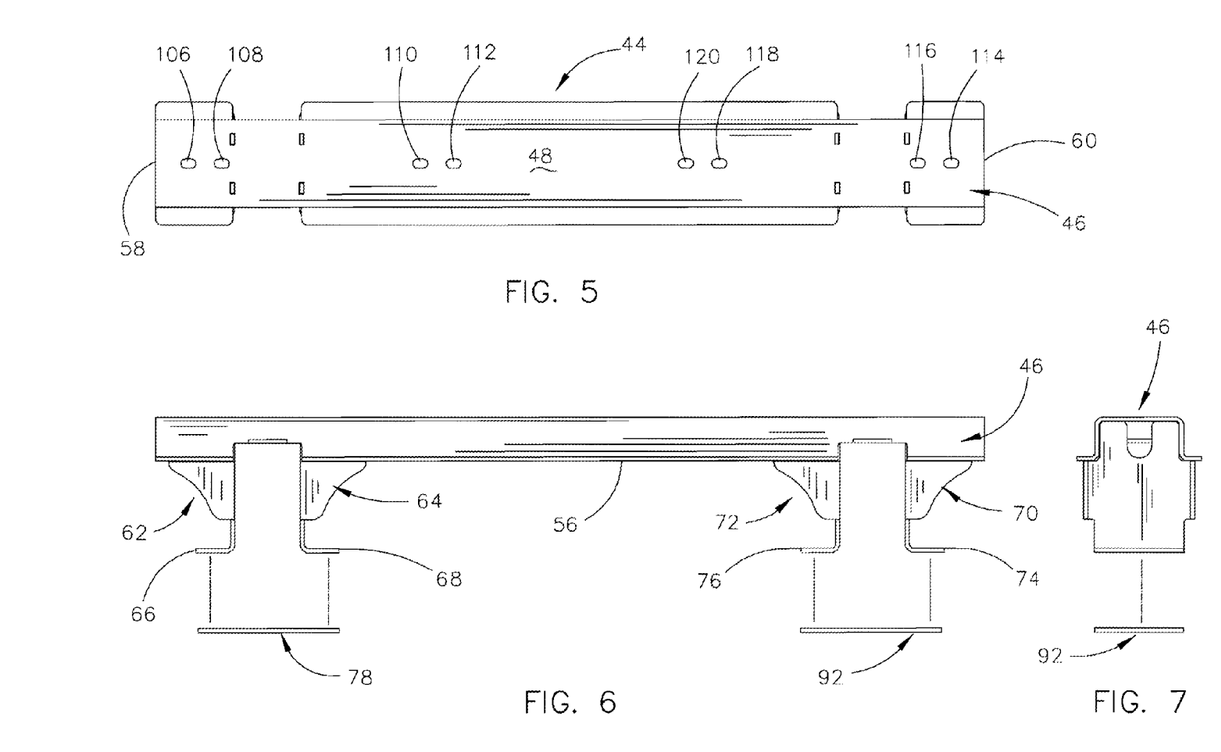
FIG. 5 is a top view of the cross-member of FIG. 4.
FIG. 6 is a front view of the cross-member of FIG. 4.
FIG. 7 is an end view of the cross-member of FIG. 4.
Figure 8:
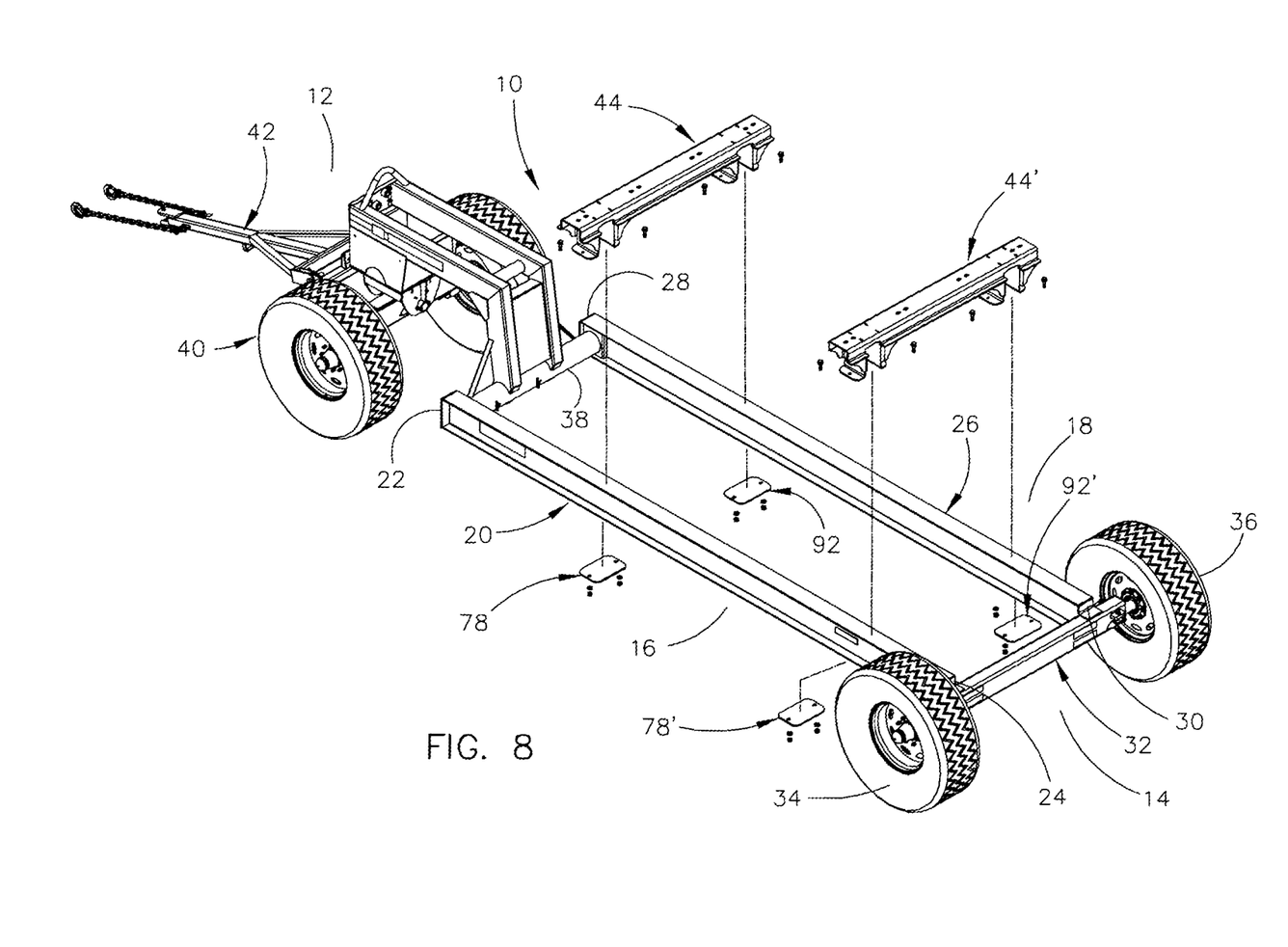
FIG. 8 is an exploded perspective view of the anhydrous ammonia trailer of this invention.
Figure 9:
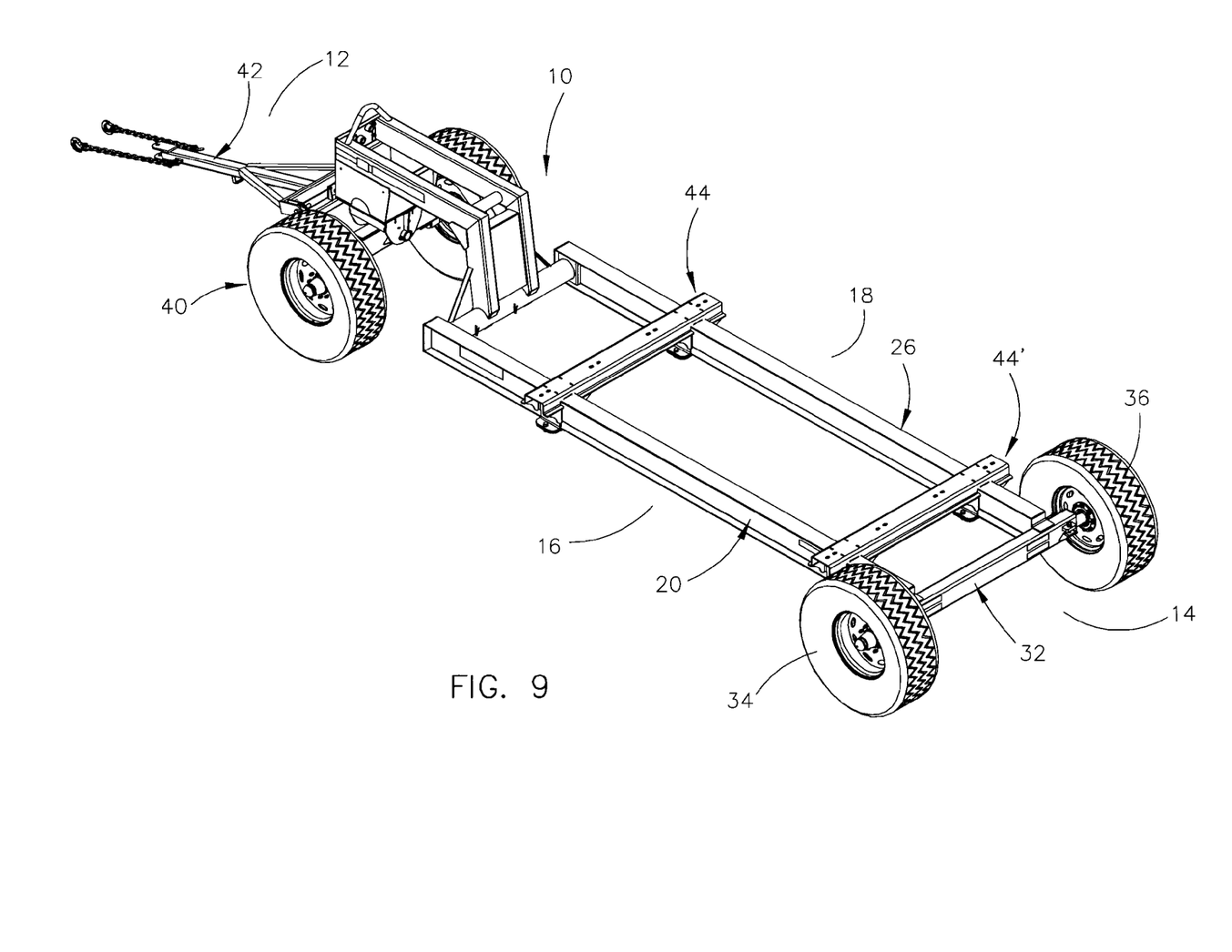
FIG. 9 is a perspective view of the anhydrous ammonia trailer of this invention.
Figure 10:
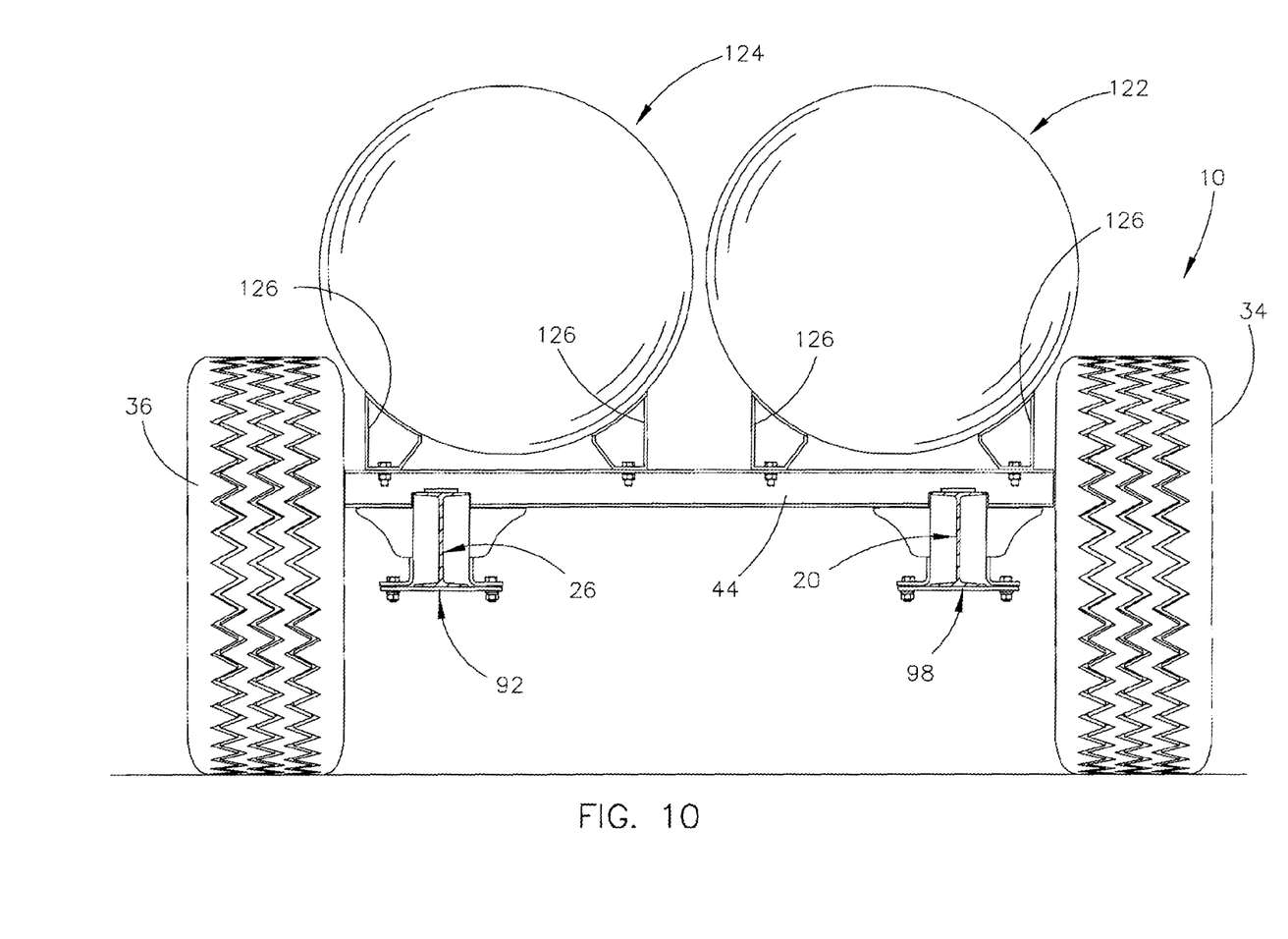
FIG. 10 is a partial rear sectional view of the anhydrous ammonia trailer of this invention.
Figure 11:
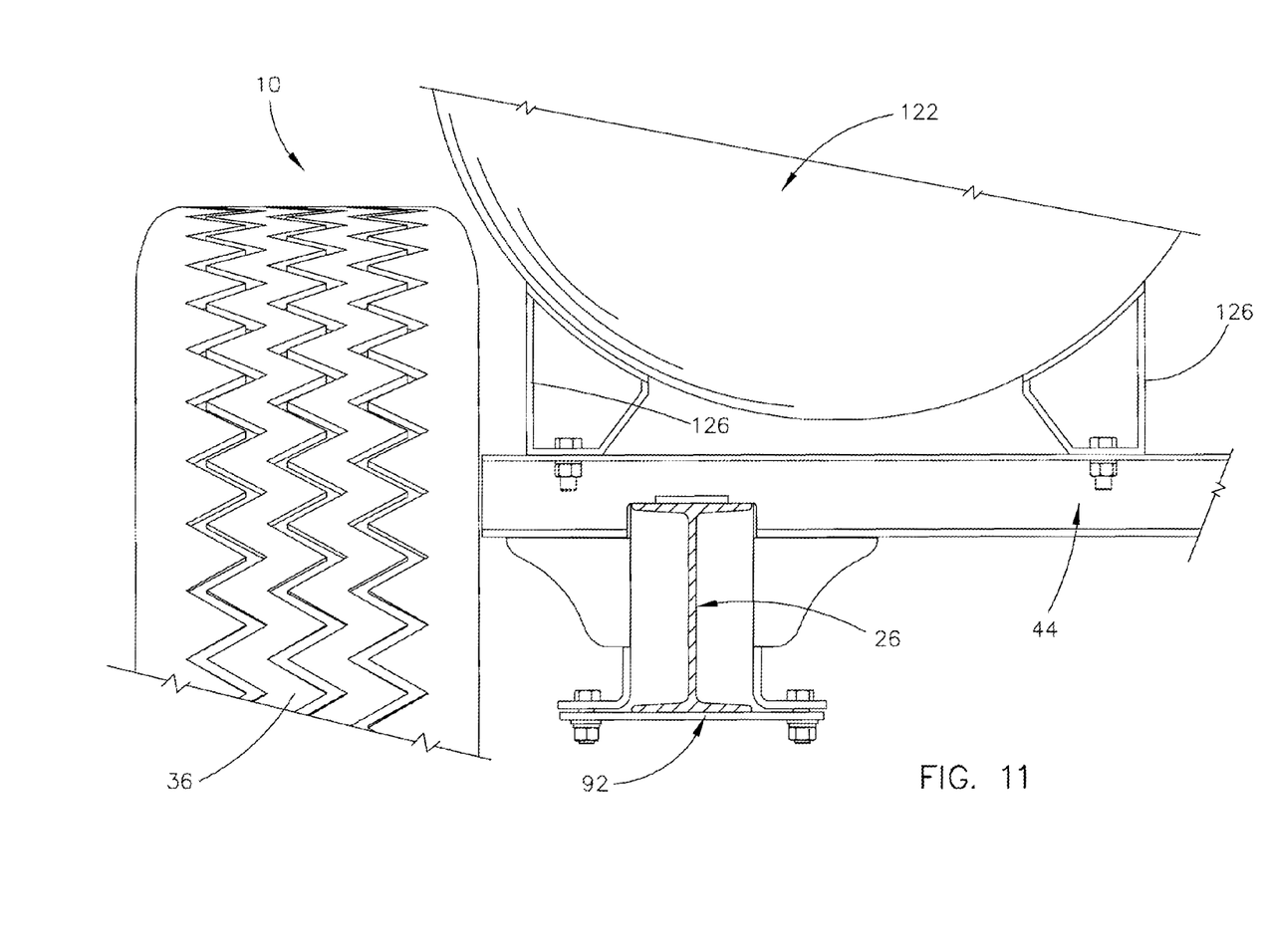
FIG. 11 is a partial front sectional view of the anhydrous ammonia trailer of this invention.

Trailer 10 also includes cross-members 44 and 44'. Inasmuch as cross-member 44' is identical to cross-member 44, only cross-member 44 will be described in detail. Cross-member 44 includes an elongated and horizontally disposed inverted channel member 46 having a base portion 48, web portions 50 and 52, and flanges 54 and 56. Channel member 46 will be described as having a first or left end 58 and a second or right end 60. Spaced-apart brackets 62 and 64 are secured to channel member 46 and extend downwardly therefrom adjacent end 58 thereof. As seen in FIG. 4, flanges 66 and 68 extend outwardly from the lower ends of brackets 62 and 64 respectively. Spaced-apart brackets 70 and 72 extend downwardly from channel member 46 at end 60 of channel member 44 and have flanges 74 and 76 extending outwardly from the lower ends thereof respectively. As seen, flanges 66, 68, 74 and 76 have bolt openings formed therein.

The numeral 78 refers to a flat plate having bolt openings 80 and 82 formed therein. Plate 78 may be secured to flanges 66 and 68 by bolts 84 and 86 which extend downwardly through the bolt openings in flanges 66 and 68 and through bolt openings 80 and 82 respectively in plate 78. Nuts 88 and 90 are threadably secured to the lower ends of bolts 84 and 86 respectively.

The numeral 92 refers to a flat plate having bolt openings 94 and 96 formed therein. Plate 92 may be secured to flanges 74 and 76 by bolts 98 and 100 which extend downwardly through the bolt openings in flanges 74 and 76 respectively and which extend downwardly through the bolt openings 94 and 96 in plate 92 respectively. Nuts 102 and 104 are threadably secured to the lower ends of bolts 98 and 100 respectively.

Spaced-apart bolt openings 106 and 108 are formed in base portion 48 inwardly of end 58 thereof. Spaced-apart bolt openings 110 and 112 are formed in base portion 48 inwardly of bolt openings 106 and 108 as seen in FIG. 4. Spaced-apart bolt openings 114 and 116 are formed in base portion 48 inwardly of end 60 thereof. Spaced-apart bolt openings 118 and 120 are formed in base portion 48 inwardly of bolt openings 114 and 116.

Cross-members 44 and 44' are selectively removably and longitudinally adjustably mounted on frame members 20 and 26 so as to extend therebetween at the desired location thereon which is dependent upon the particular anhydrous ammonia tanks which will be mounted on the cross-members 44 and 44'. When the cross-member 44 is positioned in the correct position on frame members 20 and 26, the plate 78 is secured to brackets 62 and 64 and the plate 92 is secured to brackets 70 and 72 to maintain the cross-member 44 in position. The cross-member 44' is secured to front members 20 and 26 as disclosed above.

The cross-members 44 and 44' are designed to have two 1000 gallon anhydrous ammonia tanks or two 1450 gallon anhydrous ammonia tanks secured thereto. For description purposes, the 1000 gallon tanks will be designated with the reference numerals 122 and 124. Each of the tanks 122 and 124 have a support mount, pad, or foot 126 secured to the underside thereof at the left front end, the right front end, the left rear end and the right rear end of the tank. Each of the support mounts, pads, or feet 126 have at least one bolt opening formed therein. If the tanks 122 and 124 are of the 1000 gallon type, the tank 122 is positioned on the cross-members 44 and 44', which have been previously adjustably mounted on frame members 20 and 26 so that:

(1) the bolt opening in the left front end foot 126 of tank 122 registers with bolt opening 108 in cross-member 44;

(2) the bolt opening in the right front end foot 126 of tank 122 registers with bolt opening 112 in cross-member 44;

(3) the bolt opening in the left rear end foot 126 of tank 122 registers with the bolt opening 108 in cross-member 44'; and (4) the bolt opening in the right rear end foot 126 of tank 122 registers with the bolt opening 112 in cross-member 44'.

Bolts are then extended through the registering bolt openings in the feet 126 and the cross-members 44 and 44' to secure the tank 122 to the chassis of the trailer 10.

Tank 124 is secured to cross-members 44 and 44' as will now be described. The tank 124 is positioned on the cross-members 44 and 44' so that:

(1) the bolt opening in the left front end foot 126 thereof registers with bolt opening 120 in cross-member 44;
(2) the bolt opening in the right front end foot 126 thereof registers with bolt opening 116 in cross-member 44;
(3) the bolt opening in the left rear end foot 126 thereof registers with the bolt opening 120 in cross-member 44'; and
(4) the bolt opening in the right rear end foot 126 thereof registers with the bolt opening 116 in cross-member 44'.

Bolts are then extended through the registering bolt openings in the feet 126 and the cross-members 44 and 44' to secure the tank 124 to the chassis of the trailer 10.

If the tanks 122 and 124 are of the 1450 gallon type, the 1450 gallon tanks 122 and 124 are secured to the cross-members 44 and 44' as will now be described. The 1450 gallon tank 122 is positioned on cross-members 44 and 44' so that:

(1) the bolt opening in the left front end foot 126 thereof registers with bolt opening 106 in cross-member 44;
(2) the bolt opening in the right front end foot 126 thereof registers with bolt opening 110 in cross-member 44;
(3) the bolt opening in the left rear end foot 126 thereof registers with the bolt opening 106 in cross-member 44'; and
(4) the bolt opening in the right rear end foot 126 thereof registers with the bolt opening 110 in cross-member 44'.

Bolts are then extended through the registering bolt openings in the feet 126 of the 1450 gallon tank 122 and the cross-member 44 and 44' to secure the 1450 gallon tank to the chassis of the trailer 10.

The 1450 gallon tank 124 is secured to cross-members 44 and 44' as will now be described. The 1450 gallon tank 124 is positioned on cross-members 44 and 44' so that:

(1) the bolt opening in the left front end foot 126 thereof registers with bolt opening 118 in cross-member 44;
(2) the bolt opening in the right front end foot 126 thereof registers with bolt opening 114 in cross-member 44;
(3) the bolt opening in the left rear end foot 126 thereof registers with the bolt opening 118 in cross-member 44'; and
(4) the bolt opening in the right rear end foot 126 thereof registers with the bolt opening 114 in cross-member 44'.

Bolts are then extended downwardly through the registering bolt openings in the feet 126 and the cross-members 44 and 44' to secure the 1450 gallon tank to the chassis of the trailer 10.

Figure 12:
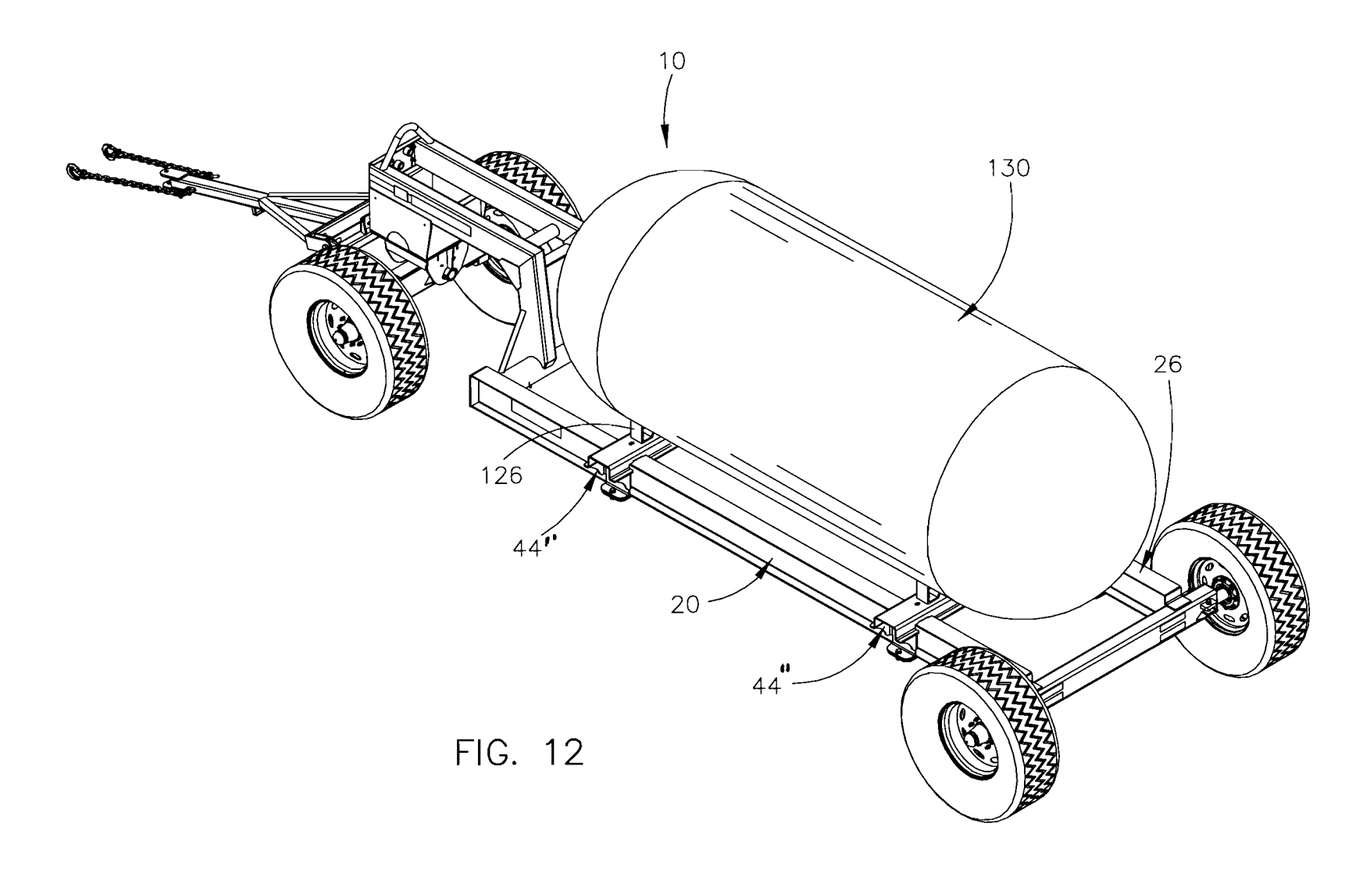
FIG. 12 is a perspective view of a modified trailer of this invention wherein a single anhydrous ammonia tank is mounted on the trailer.
Figure 13:
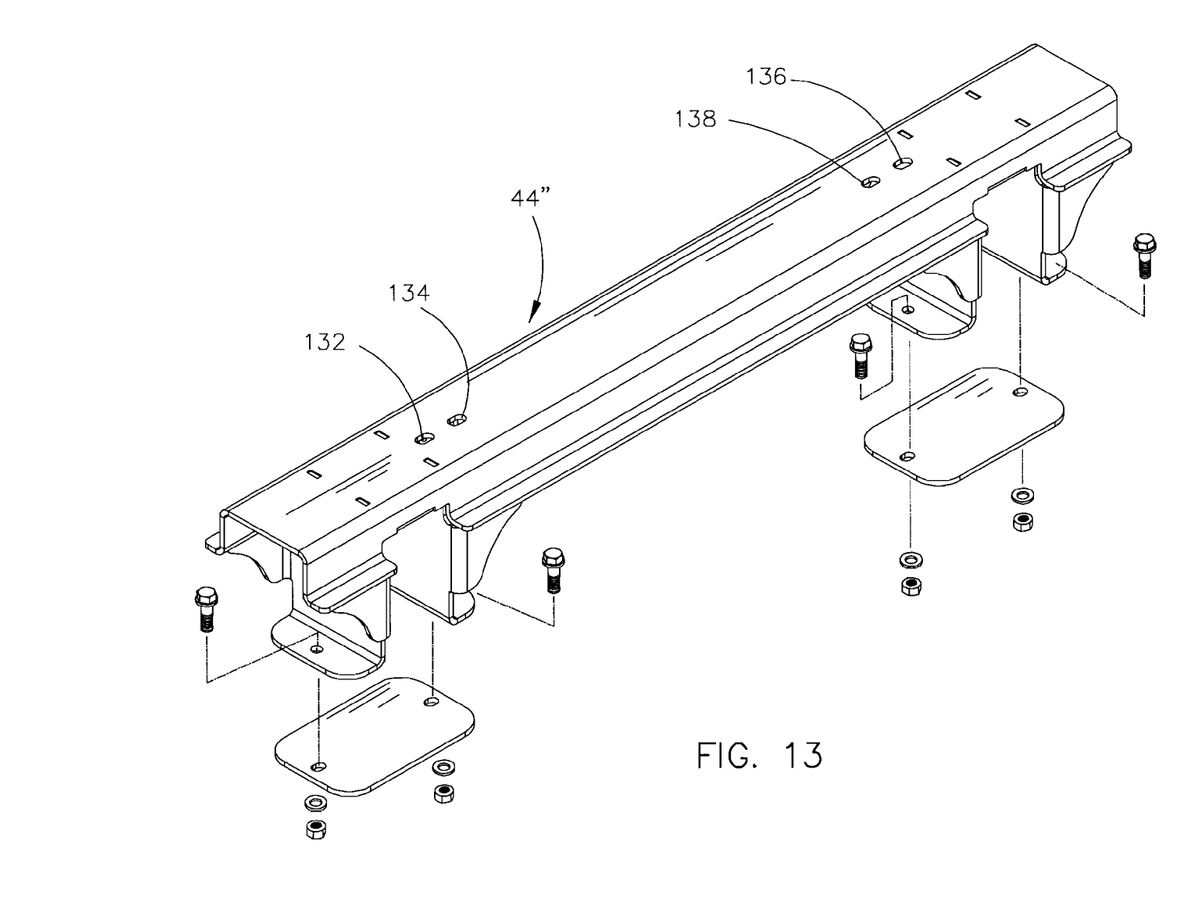
FIG. 13 is a perspective view of one of the cross-members of the trailer of FIG. 12.
Figure 14:
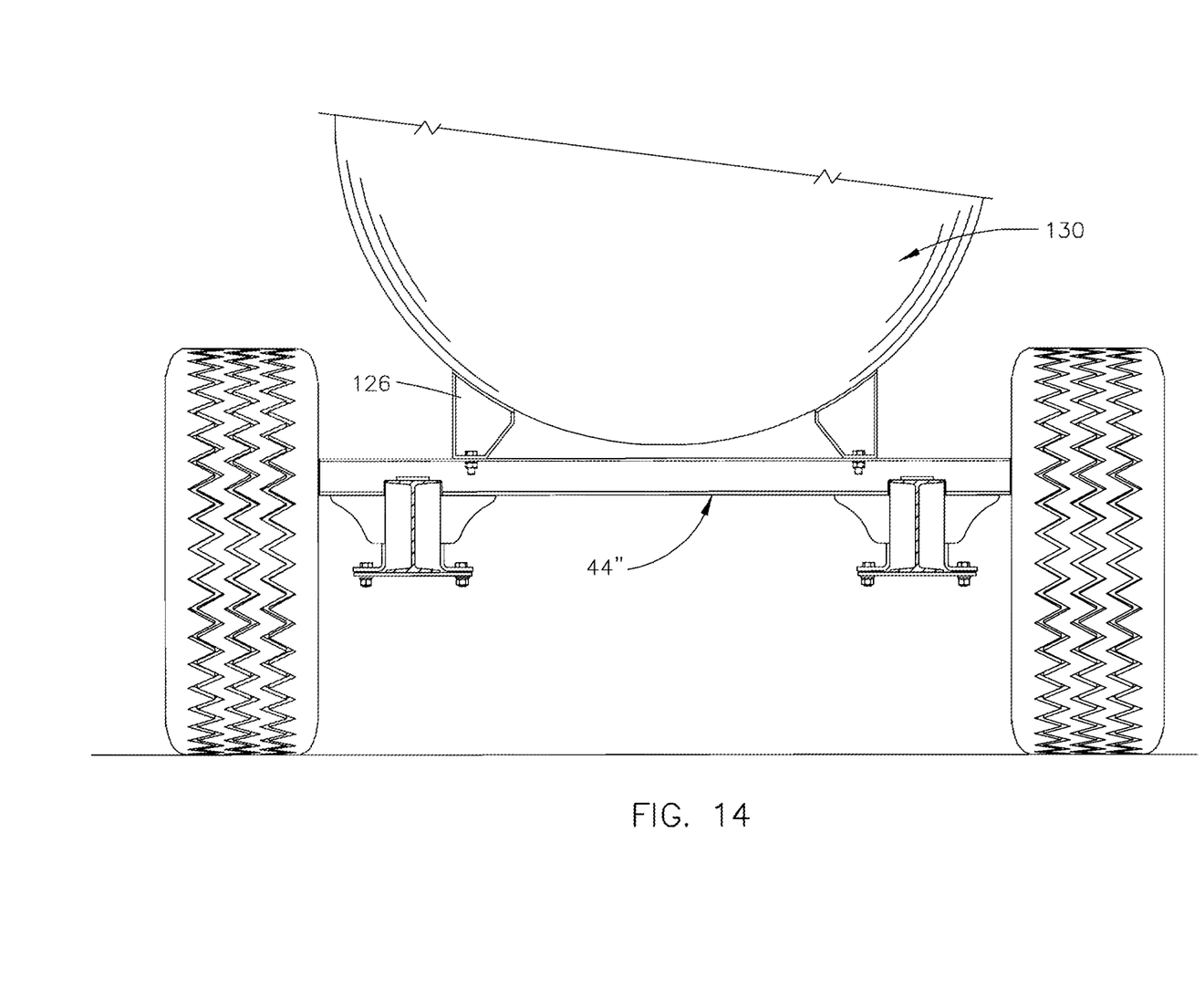
FIG. 14 is a rear sectional view of the trailer of FIG. 12.

FIG. 12-14 illustrate that the trailer 10 is being used to transport a single anhydrous ammonia tank 130 which could be a 2000 gallon tank or a 3000 gallon tank. In such a situation, a pair of cross-members 44" are selectively removably secured to the frame members 20 and 26 in the same way that the cross-members 44 and 44' are secured to the frame members 20 and 26. The cross-members 44" are selectively longitudinally adjustable with respect to frame members 20 and 26 in the same manner as cross-members 44 and 44' as mounted on the frame members 20 and 26.

The difference between cross-member 44" and cross-member 44 is that cross-member 44" has four bolt openings 132, 134, 136 and 138 to enable the feet 126 of different tank sizes to be secured to the cross-member. Since the tank 130 is considerably larger than the tanks 122 and 124, the center portion of cross-member 44" will sometimes dwell in a plane which is lower than the ends of cross-member 44" so that a lower portion of the tank 130 will be positioned between the frame members 20 and 26 and somewhat lower than the upper ends of the frame members 20 and 26.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An anhydrous ammonia trailer, comprising:
an elongated and generally horizontally disposed first frame member having a forward end, a rearward end, a lower end and an upper end;
an elongated and generally horizontally disposed second frame member having a forward end, a rearward end, a lower end and an upper end;
said first and second frame members being spaced from one another;
a pivotal wheel assembly operatively secured to said forward ends of said first and second frame members;
a first wheel operatively secured to said first frame member adjacent said rearward end thereof;
a second wheel operatively secured to said second frame member adjacent said rearward end thereof;
an elongated and horizontally disposed front cross-member positioned on said upper ends of said first and second frame members and being secured to said first and second frame members and which extends therebetween;
said front cross-member including a flat base portion having a first end, a second end, a forward end and a rearward end;
said flat base portion of said front cross-member having a plurality of spaced-apart bolt openings formed therein;
an elongated and horizontally disposed rear cross-member positioned on said upper ends of said first and second frame members and being secured to said first and second frame members and which extends therebetween;
said rear cross-member including a flat base portion having a first end, a second end, a forward end and a rearward end;
said flat base portion of said rear cross-member having a plurality of spaced-apart bolt openings formed therein;
said front and rear cross-members configured to have a first anhydrous ammonia tank secured thereto by bolts at said first ends thereof;
said front and rear cross-members configured to have a second anhydrous ammonia tank secured thereto by bolts at said second ends thereof; and said bolt openings in said flat base portions of said front and rear cross-members being spaced-apart a pre-determined distance to permit various sizes of anhydrous ammonia tanks to be bolted thereto.

2. The anhydrous ammonia trailer of claim 1 wherein said front and rear cross-members are selectively longitudinally adjustably secured to said first and second frame members.

3. The anhydrous ammonia trailer of claim 1 wherein said front and rear cross-members are selectively removably mounted on said first and second frame members to permit said front and rear cross-members to be replaced by other cross-members having different bolt opening configurations.

4. The anhydrous ammonia trailer of claim 1 wherein said front and rear cross-members are selectively removably mounted on said first and second frame members to permit said front and rear cross-members to be replaced by other cross-members having different bolt opening configurations.

5. An anhydrous ammonia trailer, comprising:
an elongated and generally horizontally disposed first frame member having a forward end, an upper end and a lower end;
an elongated and generally horizontally disposed second frame member having a forward end, an upper end and a lower end;
said first and second frame members being spaced from one another;
a pivotal wheel assembly operatively secured to said forward ends of said first and second frame members;
a first wheel operatively secured to said first frame member adjacent said rearward end thereof;
a second wheel operatively secured to said second frame member adjacent said rearward end thereof;
an elongated and horizontally disposed front cross-member positioned on said upper ends of said first and second frame members and being secured to said first and second frame members and which extends therebetween;
said front cross-member including a flat base portion having a first end, a second end, a forward end and a rearward end;
said flat base portion of said front cross-member having at least one first bolt opening formed therein inwardly of said first end thereof;
said flat base portion of said front cross-member having at least one second bolt opening formed therein inwardly of said at least one first bolt opening thereof;
said flat base portion of said front cross-member having at least one third bolt opening formed therein inwardly of said second end thereof;
said flat base portion of said front cross-member having at least one fourth bolt opening formed therein inwardly of said at least one third bolt opening thereof;
an elongated and horizontally disposed rear cross-member positioned on said upper ends of said first and second frame members and secured to said first and second frame members which extends therebetween;
said rear cross-member including a flat base portion having a first end, a second end, a forward end and a rearward end;
said flat base portion of said rear cross-member having at least one first bolt opening formed therein inwardly of said first end thereof;
said flat base portion of said rear cross-member having at least one second bolt opening formed therein inwardly of said at least one first bolt opening thereof;
said flat base portion of said rear cross-member having at least one third bolt opening formed therein inwardly of said second end thereof;
said flat base portion of said rear cross-member having at least one fourth bolt opening formed therein inwardly of said at least one third bolt opening thereof;
said front and rear cross-members configured to have an anhydrous ammonia tank secured thereto by bolts;
said at least one first, second, third and fourth bolt openings in said flat base portions of said front and rear cross-members being spaced-apart a pre-determined distance to permit various sizes of anhydrous ammonia tanks to be bolted thereto.

6. The anhydrous ammonia trailer of claim 5 wherein said front and rear cross-members are selectively longitudinally adjustably secured to said first and second frame members.

* * * * *